United States Patent [19]

Bailey

[11] 4,125,147
[45] Nov. 14, 1978

[54] METHOD FOR CONTINUOUSLY MAINTAINING A RADIATOR FREE OF DEBRIS

[75] Inventor: John M. Bailey, Dunlap, Ill.

[73] Assignee: Caterpillar Tractor Co., Peoria, Ill.

[21] Appl. No.: 806,392

[22] Filed: Jun. 13, 1977

Related U.S. Application Data

[62] Division of Ser. No. 701,335, Jun. 30, 1976, Pat. No. 4,057,105.

[51] Int. Cl.² .............................................. F28G 13/00
[52] U.S. Cl. ......................................... 165/1; 55/268; 55/293; 55/304; 55/351; 55/385 B; 165/95; 180/68 P
[58] Field of Search ....................... 165/41, 44, 119, 1, 165/95; 55/290, 293, 295, 299, 302, 304, 268, 385 B, 351, 296; 180/68 P

[56] References Cited

U.S. PATENT DOCUMENTS

| | | | |
|---|---|---|---|
| 736,596 | 8/1903 | Gröndahl | 210/386 |
| 3,302,795 | 2/1967 | Jacobs | 55/351 |
| 3,309,847 | 3/1967 | Donaldson | 55/351 |
| 3,337,898 | 8/1967 | Schmid et al. | 55/351 |
| 3,344,854 | 10/1967 | Boyajian | 180/68 P |
| 3,552,098 | 1/1971 | Iochran | 55/351 |

Primary Examiner—Charles J. Myhre
Assistant Examiner—Sheldon Richter
Attorney, Agent, or Firm—Phillips, Moore, Weissenberger, Lempio & Majestic

[57] ABSTRACT

A method for continuously maintaining a radiator free of debris comprises steps of rotating an endless and perforated belt about the radiator and simultaneously twisting the belt 180° during each rotation thereof to form a "mobius strip" whereby the front and back sides of the radiator are each exposed to both sides of the belt during rotation thereof.

4 Claims, 9 Drawing Figures

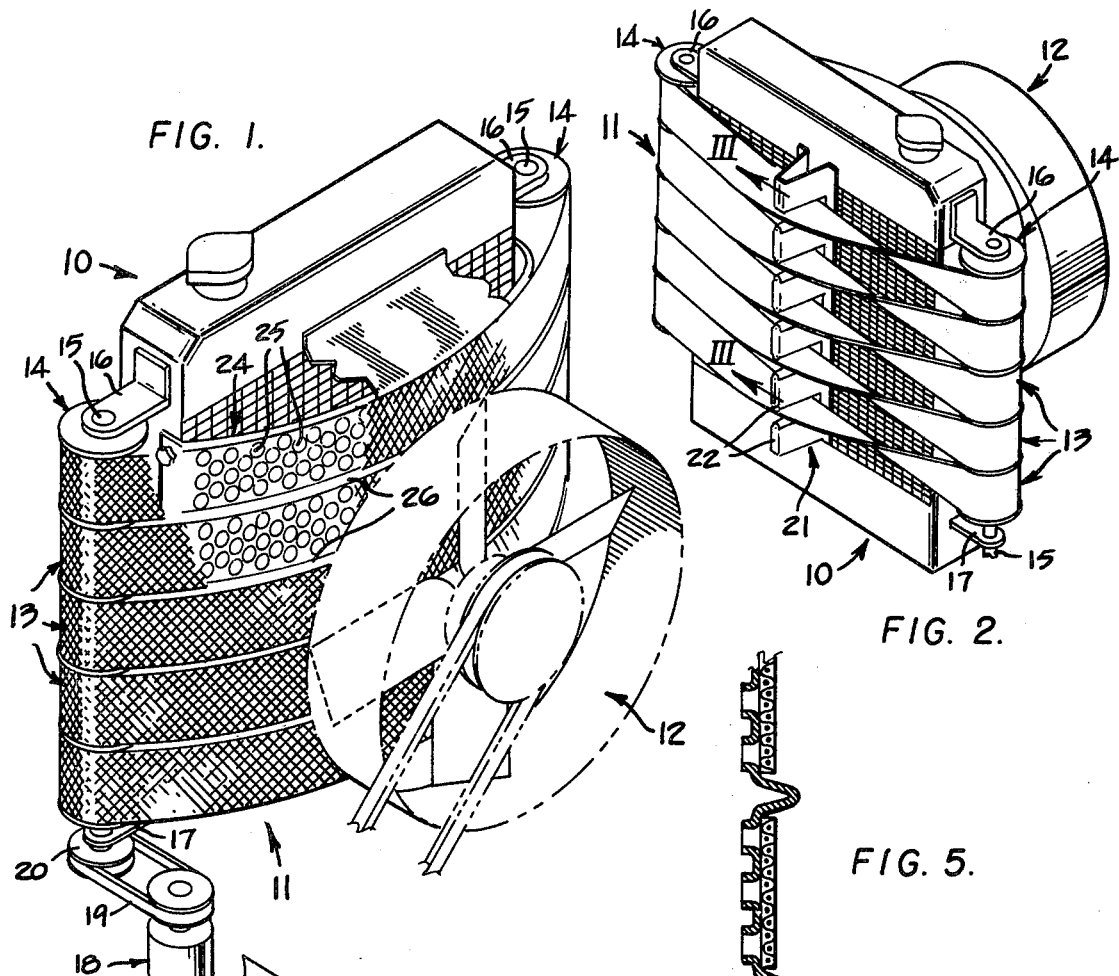
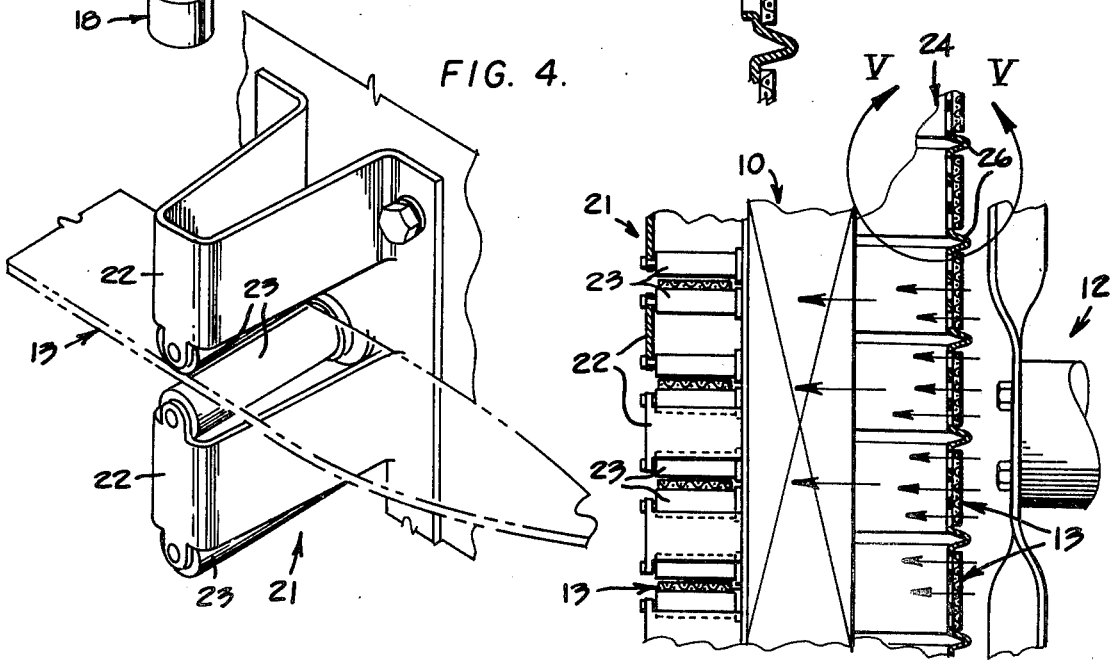

METHOD FOR CONTINUOUSLY MAINTAINING A RADIATOR FREE OF DEBRIS

This is a division of Ser. No. 701,335, filed June 30, 1976, now U.S. Pat. No. 4,057,105.

BACKGROUND OF THE INVENTION

The water-cooled radiator employed on a construction vehicle, such as a log skidder, is subjected to plugging due to the ingress of debris therein. Such plugging is a particular problem with respect to radiators comprising closely spaced fins for the purpose of improving cooling capabilities and/or for reducing radiator core size. Proposed solutions to the plugging problem have included constructing the radiator with less than nine fins per inch and mounting screens in front of the radiator to screen-out debris prior to its ingress into the radiator. Such arrangements require close attention and periodic cleaning to maintain the cooling capacity of the radiator at an acceptable level.

SUMMARY OF THIS INVENTION

An object of this invention is to provide an economical and noncomplex method for maintaining a radiator free of debris.

The method comprises rotating an endless and perforated belt about the radiator and simultaneously twisting the belt 180° during each rotation thereof to form a "mobius strip" whereby the front and back sides of the radiator are each exposed to both sides of the belt during rotation thereof.

BRIEF DESCRIPTION OF THE DRAWINGS

Other objects of this invention will become apparent from the following description and accompanying drawings wherein:

FIG. 1 is an air inlet side isometric view of a radiator having a self-cleaning screen assembly of this invention associated therewith;

FIG. 2 is an air outlet side isometric view of the screen assembly;

FIG. 3 is a sectional view of the radiator and screen assembly, generally taken in the direction of arrows III—III in FIG. 2;

FIG. 4 is an enlarged isometric view of a pair of guide members employed in the screen assembly;

FIG. 5 is an enlarged sectional view, generally taken within circle V—V in FIG. 3;

DETAILED DESCRIPTION

Figure 6:
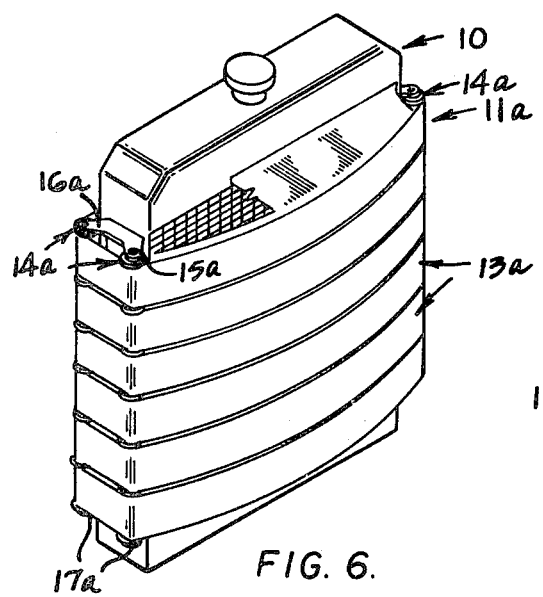
FIG. 6 is a view similar to FIG. 1, but illustrating a modification of guide and drive rollers employed in the screen assembly.

FIG. 1 illustrates a conventional water-cooled radiator 10 having a self-cleaning screen assembly 11 of this invention associated therewith. An engine driven fan assembly 12 of the blower-type is adapted to be mounted in an engine compartment on the inboard or back side of the radiator to aid in blowing air therethrough. As will be hereinafter more fully understood, screen assembly 11 will function to pick-up any debris prior to its ingress into the radiator and automatically discharge the same on the outboard or front side thereof and exteriorly of a vehicle. Modifying the assembly 11 a suction fan could be used.

The screen assembly illustrated in FIGS. 1–5 comprises a plurality of horizontally disposed and perforated endless belt means or belts 13 which circumvent the radiator. Each belt may comprise a fine mesh screen construction, composed of rubber, rubberized fabric, high-strength stainless steel, plastic or any other suitable material which will flex and provide the other operational desiderata hereinafter described. The lateral ends of the flexible belt engages and is guided by vertically disposed first guide means or rollers 14, mounted on either lateral end of the radiator. In particular, each roller is secured to a vertically disposed shaft 15 having its opposite ends suitably rotatably mounted in vertically spaced brackets 16 and 17, secured to a respective side of the radiator. Alternatively, a separate roller may be provided for each belt 13.

FIG. 1 further schematically illustrates drive means for continuously rotating the belts during operation of the vehicle. Such drive means may comprise an electric, hydraulic or air-actuated motor 18. The motor may be suitably mounted on the frame of the vehicle to have its output shaft drive a belt 19, entrained about a pulley 20 secured on the lower end of shaft 15 to rotate a roller 14. Alternatively, a small windmill type device, driven by the air stream emanating from fan assembly 12, could be employed as the drive means to rotate roller 14.

As shown in FIGS. 2–4, belt means 13 are supported on the front side of the radiator by a vertically disposed first guide means comprising a bracket 21. The bracket is secured intermediate the lateral ends of the radiator and has a plurality of equally and vertically spaced guide members 22 extending forwardly therefrom. Each pair of vertically adjacent guide members has a roller 23 rotatably mounted thereon to define a guide opening therebetween for engaging and guiding a particular belt therethrough.

Each belt is preferably half-twisted, as clearly shown in FIG. 2, to form a "mobius strip". Such twisting will function to turn the belt completely over as it moves past the front side of the radiator to expose both sides thereof to the air stream forced therethrough by fan assembly 12. Thus, debris carried by the belts will be blown-off the belt and dumped exteriorly of the vehicle. It should be further noted that the arrangement of guide means 21 may further induce a slight fluttering of the belts to further aid in the dislodgement of debris therefrom. However, the clearance defined between each pair of adjacent rollers 23 is sufficiently small to minimize vibrations imparted to the belt while yet permitting a slight fluttering thereof due to its extended length between the guide means and each roller 14.

Referring to FIGS. 1, 3 and 5, each belt is guided on the cooling air inlet side of radiator 10 by a horizontally disposed third guide means comprising an arcuate guide plate 24. The guide plate is secured at its lateral ends to the ends of the radiator with the intermediate mid-portion of the plate being spaced at a maximum distance from the radiator. As shown, the guide plate may be stamped from a relatively thin sheet of metal to have a plurality of holes 25 formed therethrough and may have an upper plate and a bottom plate (not shown) secured between it and the radiator to prevent the ingress of foreign materials therebetween. In addition, a plurality of vertically spaced and horizontally disposed guide ribs 26 are formed integrally on the plate with each pair of vertically adjacent ribs receiving a belt 13 therebetween.

As more clearly shown in FIG. 5, ribs 26 function to entrap and to prevent vertical movement of the belt. Holes 25 are formed sufficiently large to assure a relatively unrestricted flow of air therethrough and to provide a minimal metal contact with the belt means. If so desired, the metallic portions of the guide plate, engaging the belt, could be chrome plated or provided with any other suitable low friction surface thereon (e.g., Teflon) to further reduce the coefficient of friction between the belt and the guide plate.

In view of the above description, it can be seen that the self-cleaning screen assembly of this invention permits a relatively close spacing of the radiator fins together (e.g., more than nine fins per inch) and also assures that the radiator will function substantially up to its full cooling capacity, even when operating in heavy dirt and debris laden environments. The half-twist imparted to each belt 13 aids in the cleaning function, as above described and also exposes a different side thereof to guide plate 24 upon each complete rotation of the belt means to reduce belt wear by approximately one-half. Also, by providing a substantially open structure at the air exit side, pressure loss normally caused by the screen is reduced by approximately 50%.

Figure 7:
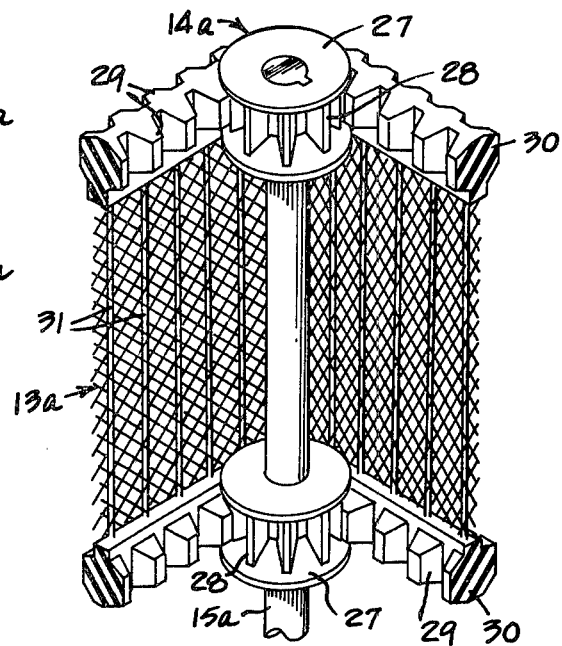
FIG. 7 is a fragmentary view illustrating one of the FIG. 6 guide and drive rollers.

FIGS. 6–9 illustrate modifications of the FIGS. 1–5 screen assembly wherein identical numerals depict corresponding construction, but with numerals depicting modified constructions in FIGS. 6–9 being accompanied by a subscript "a" or "b". In FIGS. 6 and 7, a self-cleaning screen assembly 11a comprises a plurality of belts 13a engaged and guided by a modified guide means mounted on either lateral end of radiator 10. Each such guide means further aids in the driving function and comprises a pair of sprocket and guide assemblies 14a mounted for rotation between a pair of brackets 16a secured to a respective side of the radiator.

As shown in FIG. 7, each sprocket assembly may comprise a shaft 15a, having a plurality of vertically spaced rollers or sprocket members 27 secured thereon for rotation therewith. Each sprocket member has a plurality of radial teeth 28 formed thereon adapted to engage like-shaped teeth 29 formed on a flexible and reinforced rubber drive belt 30, secured to a respective edge of a belt 13a. The main body of the belt may be composed of the type of screen-like material described above and may be further reinforced by a plurality of vertically disposed and horizontally spaced metallic rods 31 secured between each pair of belts 30.

One of the shafts 15a may be rotated by drive means, such as motor 18 in FIG. 1, to thus rotate the integrated belt means about the radiator. The guide means employed on the front side of the radiator may correspond to guide means 21 of the above described screen assembly. The employment of a pair of guide means 14a on each end of the radiator provides space-saving desiderata in that the belts may be disposed closer to the ends of the radiator in contrast to the single roller arrangement of FIGS. 1–5.

Figure 8:
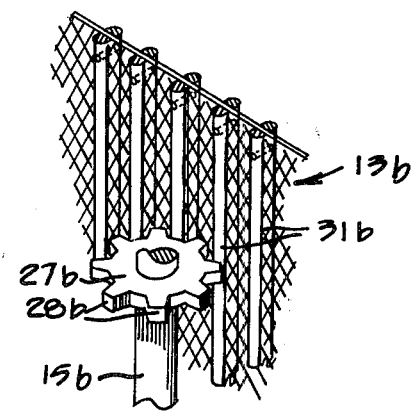
FIG. 8 is a fragmentary view of another modification of the guide and drive roller.

FIG. 8 illustrates a modification of the FIG. 7 combined guide and drive means for each belt 13b. The belt has a plurality of vertically disposed reinforcing rods 31b secured thereon for tracked engagement with teeth 28b of a roller or sprocket member 27b. The sprocket is secured to a shaft 15b which corresponds to shaft 15a in FIG. 7. The rods are exposed on each side of the belt since the belt, when conforming to a "mobius strip" will flop over during each rotation thereof.

Figure 9:
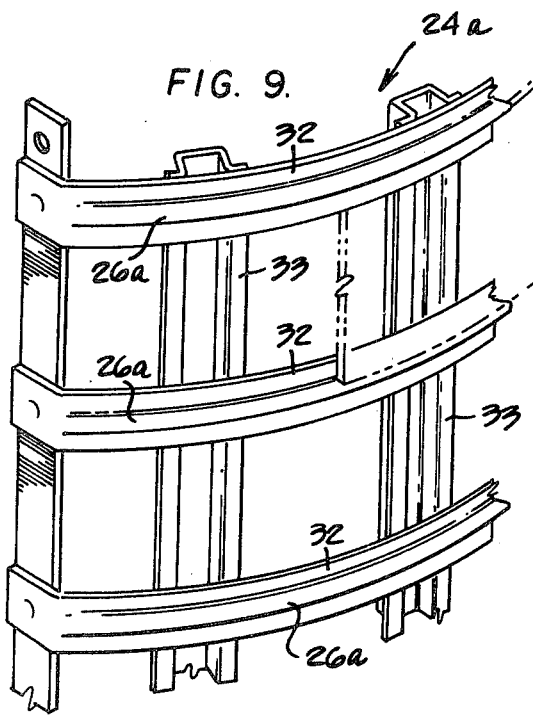
FIG. 9 is a fragmentary view of a modified guide plate which may be employed in the screen assembly.

FIG. 9 discloses a modification 24a of guide plate 24 (FIG. 1) mounted on the back side of the radiator to guide belts 13 or 13a thereacross. In such modification, each belt is disposed between a pair of horizontally disposed and vertically spaced guide ribs 26a formed integrally on cross members 32, secured to vertically disposed and horizontally spaced reinforcing members 33. The grid structure thus formed by members 32 and 33 defines a plurality of large openings for permitting the free flow of air therethrough.

I claim:

1. The method for continuously maintaining a radiator free of debris and the like during operation thereof comprising the steps of
    rotating a plurality of horizontally disposed and vertically spaced endless and perforated belts about said radiator and on spaced-apart, parallel and vertically disposed axes, and
    simultaneously twisting each belt one-half a turn during each rotation of said belt to form a "mobius strip" therewith whereby each front and back side of said radiator is exposed to both sides of said belt during each rotation thereof about said radiator.

2. The method of claim 1 wherein said twisting step occurs on the front side of said radiator and further comprising the step of blowing air through said belt and through said radiator from the back side thereof.

3. The method of claim 1 further comprising the step of guiding said belt at each of the ends, back side and front side of said radiator during rotation thereof.

4. The method of claim 1 wherein said rotating step comprises engaging said belt with a rotating sprocket.

* * * * *